JULIUS S. ZELL
INVENTOR

BY Geisler and Geisler
ATTORNEYS

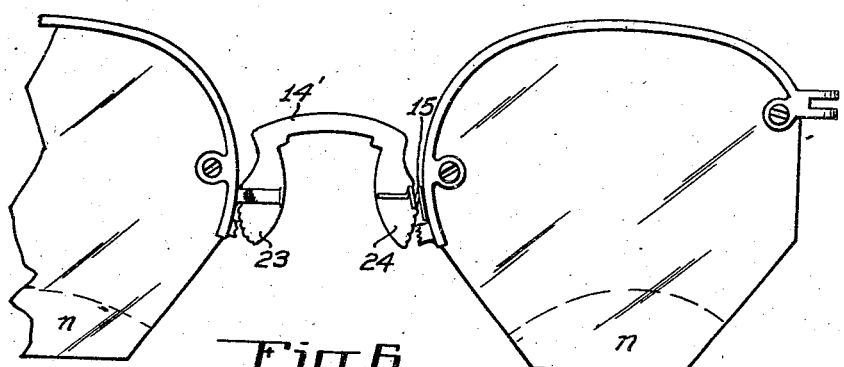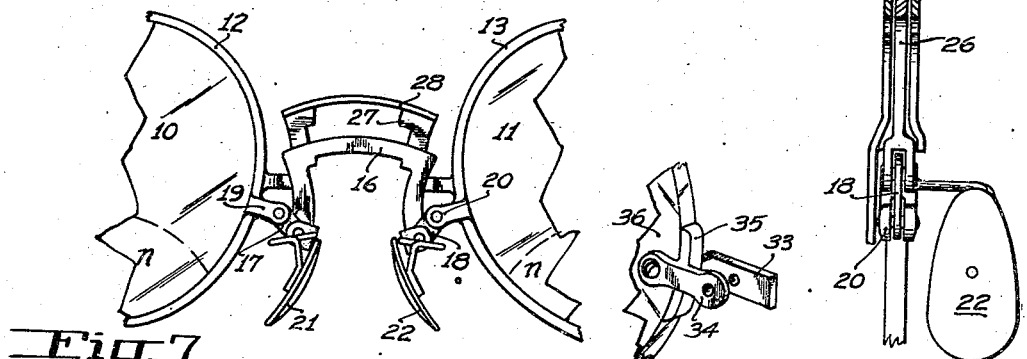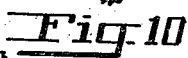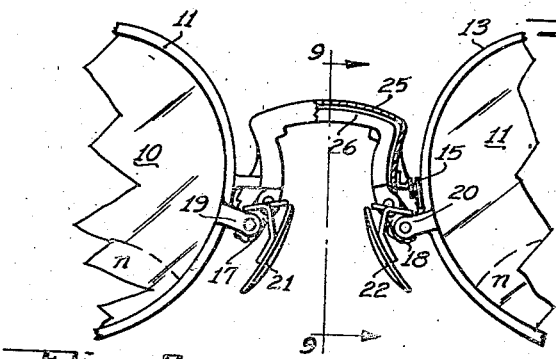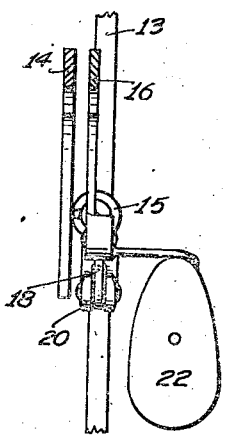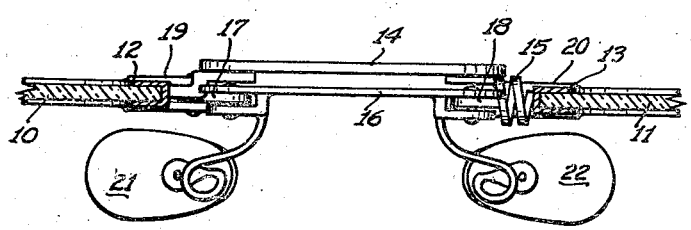

Patented Oct. 29, 1946

2,410,141

UNITED STATES PATENT OFFICE 2,410,141

VERTICALLY ADJUSTABLE BIFOCAL SPECTACLES

Julius S. Zell, Portland, Oreg.

Application September 6, 1943, Serial No. 501,412

3 Claims. (Cl. 88—49)

This invention relates to bifocal spectacles, or spectacles having lenses with bifocal segments in which one segment of the lens is adapted for distant vision and the other segment is adapted for reading or the viewing of objects near the eye. Ordinarily the reading segment is the lower segment in each lens so that the wearer of the spectacles looks downwardly through the reading segments when reading or viewing an object close to the eyes and looks straight ahead or upwardly through the other segments of the lenses when veiwing more distant objects.

There are occasions, however, when the wearer of the spectacles may desire to read something while looking straight ahead or above the level of the eyes and for this purpose it is desirable to raise the spectacles to permit looking through the lower reading segments.

In my U. S. Letters Patent No. 2,322,993, issued June 29, 1943, entitled Vertically adjustable bifocal spectacles, to which reference is made, I have described a simple means by which bifocal spectacles may be vertically adjusted to two positions. Such means comprises a bridge member adapted to rest on the nose of the wearer, said bridge member having toggle-joint connections at the ends, and a spring or flexible member connecting the tops of the lenses or spectacle frames. While the vertically adjustable spectacles constructed in the manner described in my said patent have proved very satisfactory I have found a slight objection on the part of some persons, particularly women, to the appearance given to spectacles by the flexible connecting member extending across the top of the spectacles and joining the top edges of the lenses or lens frames.

The object of the present invention accordingly is to provide an improvement in the vertically adjustable spectacle mounting of my previous patent by which this top spring member may be omitted, thereby improving the appearance of the spectacles, enabling them to be less conspicuous and to resemble ordinary spectacles when in normal position, and to be made in any style preferred by the wearer.

This object I accomplish in the present invention by substituting a second bridge, embodying a resilient element, in place of the top spring member and by so arranging the second bridge with respect to the bridge having the toggle connections as to give the appearance of only a single bridge when the spectacles are in normal position on the wearer; and by otherwise mounting the bifocal spectacles in the manner hereinafter described with reference to the accompanying drawings.

In the drawings:

Fig. 4 is a fragmentary top-view of the double bridges connecting the lens frames in Fig. 1 and corresponding to the line 4—4 of Fig. 1;

Fig. 5 is a section through the double bridges taken on the line 5—5 of Fig. 1;

Fig. 6 is a fragmentary view, from the rear, of the front bridge connecting the two lenses, with the rear or toggle bridge removed for the sake of clarity, this view illustrating how the lower portions of the front bridge may be broadened to hide the toggle connections of the rear or adjustable bridge;

Fig. 7 illustrates a modification in the structure of the front bridge in which the bridge itself is made flexible instead of being flexibly connected to one of the lens frames;

Fig. 8 illustrates another modification of the spectacle mounting in which the front bridge is channel-shaped to enable the adjustable bridge to fit within the front bridge and be concealed thereby;

Fig. 9 is a section through the bridges taken on the line 9—9 of Fig. 8; and

Fig. 10 is a detail in perspective of a modified clip or bracket suitable for connecting the double bridge mounting to a rimless lens.

Figure 1:
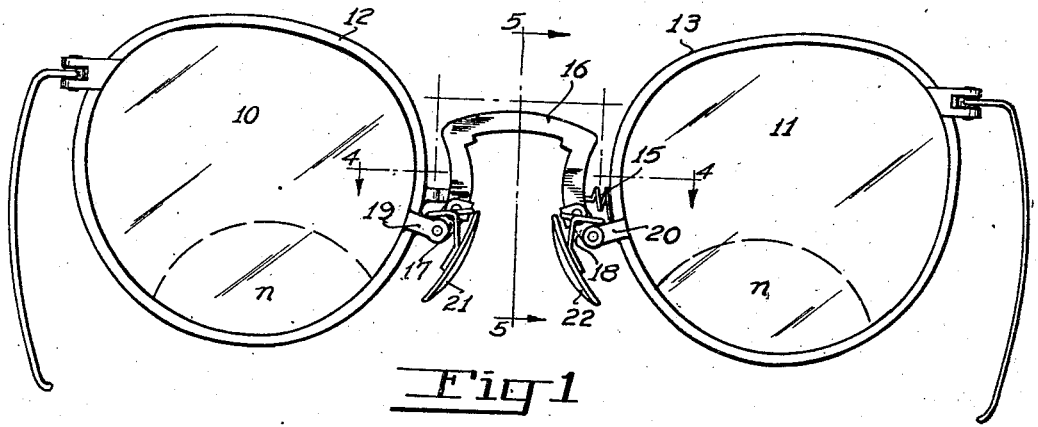
Fig. 1 shows a pair of bifocal spectacles embodying my invention, the spectacles being shown as viewed from the rear and as adjusted to the position in which they would be worn under normal conditions.
Figure 2:
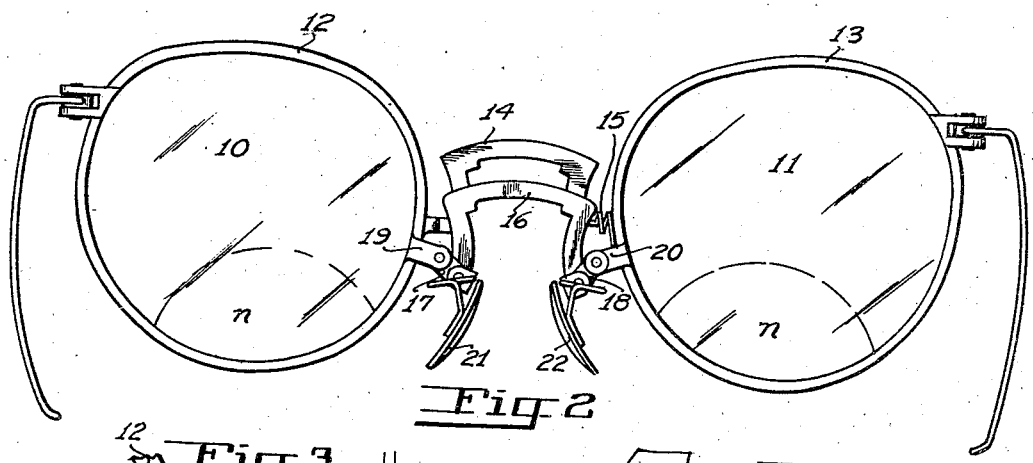
Fig. 2 shows the same spectacles of Fig. 1 with the inside bridge, or the bridge having the toggle connections, adjusted so as to raise the lenses to their high position and thus bring the lower or close-vision segments of the lenses into convenient registration with a higher line of vision.

Referring first to Figs. 1 and 2, which illustrate one practical manner in which my invention may be employed with rim-type bifocal spectacles, the two lenses 10 and 11 are mounted in the rims or frames 12 and 13 respectively. Each lens comprises two sections, the lower section $n$ in each lens being designed for reading or close-up vision, as customary with ordinary bifocal spectacles.

The two lens frames 12 and 13 are connected by a front bridge member 14 (Fig. 2), of any desired shape and design, and this bridge member is attached to the frame 13 by means of a coil spring 15 which forms a resilient connection. The other end of the bridge member 14 is attached to the other frame 12, and may be attached similarly through the medium of a coil spring or resilient element, or, as shown in the drawings, may be rigidly attached to the frame 12. The purpose of the resilient element or coil spring 15 is to enable the lenses or lens frames to be moved slightly apart when the position of the spectacles is to be adjusted on the nose of the wearer, as will be explained later. It will be apparent that a resilient connection or coil spring at one end only of the bridge 14 is sufficient for this purpose; although a similar resilient connection at the other end of the bridge joining the other lens frame could be added if preferred.

A second bridge member 16 is located behind the forward bridge 14. The ends of this second bridge 16 are connected by toggle joints 17 and 18 to ears 19 and 20 attached to the lens frames 12 and 13 respectively. Suitable nose rests 21 and 22 are secured to the ends of the bridge 16.

Figs. 1 and 2 show the two positions in which the spectacles may be worn, as previously mentioned. When the spectacles are to be changed from the normal position of Fig. 1 to the raised position of Fig. 2 all that is required is to spread the two lens frames 12 and 13 slightly apart, which is permitted by the flexible or coil spring connection 15, whereupon the second adjustable bridge member 16 can be moved downwardly due to the toggle connections. If the spectacles are lifted when the lens frames 12 and 13 are being spread slightly apart, so that the nose rests 21 and 22 are removed from contact with the nose of the wearer, it may not even be necessary to touch the adjustable bridge at all and it will be caused to drop to its desired position merely by the spreading of the lens frames. When the reverse adjustment is to take place and the spectacles are desired to resume their normal position of Fig. 1, the spreading of the lens frames 12 and 13 and a slight downward pressure will result in the adjustable bridge 16 being pushed upwardly on account of the toggle joints. Thus the spectacles can be adjusted from one position to the other without being entirely removed from the wearer. The spring connection 15 of the front bridge 14 will normally hold the lens frames bridge against spreading and thus hold the adjustable bridge 16 in either of the two positions as desired by the wearer.

In Figs. 1 and 2 the two bridge members 14 and 16 are shown as similar in design and outline so that when the spectacles are worn in the normal position of Fig. 1 the rear or adjustable bridge 16 will be practically concealed behind the front bridge 14. If it is desired, for the purpose of appearance, to conceal the toggle connections of the adjustable bridge more completely this can be done by broadening the lower sections of the front bridge, as shown in Fig. 6 in which the lower portions 23 and 24 of the bridge 14' have been widened to constitute shields behind which the toggle connections of the adjustable bridge will be hidden from view.

Instead of having the two bridges of the same shape and outline so as to have the adjustable bridge largely concealed behind the front bridge it would be possible to make the front bridge channel-shaped in cross section, as shown by the bridge 25 in Figs. 8 and 9, and to make the adjustable bridge 26 of proper shape and size to fit within the channel-shaped bridge when the spectacles are worn in normal position.

In the modification shown in Fig. 7 the front bridge 27 comprises an intermediate resilient or spring member 28. With such a resilient bridge it is possible to dispense with the coil spring connection between the bridge and one of the lens frames and still enable the lens frames to be spread apart sufficiently for moving the adjustable bridge. Obviously various types and shapes of bridges could be employed in carrying out my invention. Also my invention can be employed with rimless spectacles, as illustrated in Fig. 3a, or with semi-rimmed spectacles, as illustrated in Fig. 6.

Figures 3, 3A:
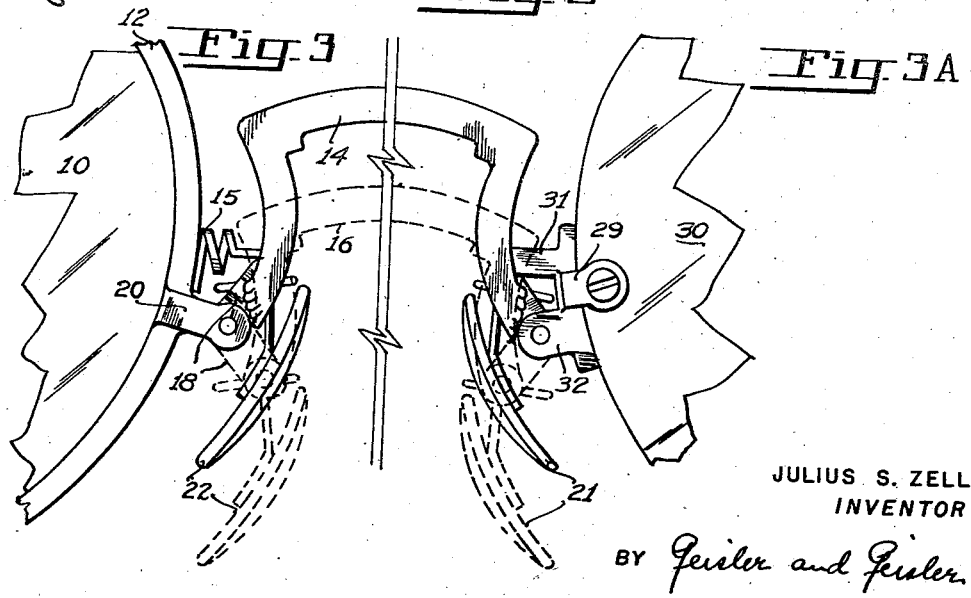
Fig. 3 is an enlarged fragmentary detail of the left-hand middle portion of the spectacles of Figs. 1 and 2 viewed from the front, the broken lines showing the position of the adjustable bridge when the spectacles are in the raised position of Fig. 2.
Fig. 3a is a corresponding fragmentary detail of the right-hand middle portion of a pair of rimless spectacles but similar in other respects to the rimmed spectacles of Figs. 1 and 2, illustrating also the employment of my invention with rimless as well as with rimmed spectacles.

In the mounting illustrated in Fig. 3a the rimless lens 30 is secured to the clip 29. The clip 29 is formed with a pair of ears 31 and 32, the front bridge being secured at one end to the upper ear 31 and the adjustable bridge having one of its toggle links connected to the lower ear 32. However, the two ears 31 and 32, instead of being arranged one above the other, could be arranged in the same horizontal plane extending from opposite faces of the lens. Such a modified form of clip for rimless lenses is shown in Fig. 10 in which the front ear 33 of the clip 35 of the rimless lens 36 is adapted for attachment to the front bridge and the rear ear 34 is adapted to have a toggle link of the rear or adjustable bridge attached thereto.

Many modifications, in the shape and structure of the two bridge members, and in the manner in which the front bridge member and the toggle links of the adjustable bridge member are attached to the lens frames or directly to the lenses, would be possible within the scope of the present invention. All that is necessary is to have a suitable bridge member resiliently connecting the two lenses or lens frames, as a substitute for the top spring member described in my previous patent above referred to, and a second bridge member having the toggle joint connections at its ends to enable it to be adjusted to the two positions as described.

I claim:

1. A mounting for spectacles having bifocal lenses, said mounting comprising a pair of elements secured to said lenses respectively, a pair of bridge assemblies located between the nasal sides of said lenses, said bridge assemblies connected to said elements, one of said bridge assemblies carrying nose rests and including toggle joints in its connections with said elements, the axes of said toggle-joints being at right angles to the plane of said lenses and said toggle-joints adapted to enable said lenses to be adjusted to high or low positions with respect to said nose rests upon a slight movement of said lenses apart, a spring section included in the other bridge assembly, said spring section connected to one of said elements and adapted to allow sufficient movement apart of said lenses to permit the making of such adjustment while enabling said lenses to be held in either said high or low position as desired, the major portions of said bridge assemblies being of similar size and shape and said assemblies so arranged as to give the general impression of a single bridge assembly when said lenses are in low position.

2. A mounting for spectacles having bifocal lenses, said mounting comprising a resilient assembly connecting the nasal sides of said lenses, said resilient assembly including a bridge member, and a second bridge member resembling in general said first bridge member in size and shape and so arranged as to be substantially concealed by said first bridge member when said second bridge member is in normal position, a pair of nose rests carried by said second bridge member, toggle-joint connections between the ends of said second bridge member and said lenses respectively, said toggle-joint connections having axes at right angles to the plane of said lenses and adapted to enable said lenses to be adjusted to high or low positions with respect to said second bridge member and nose rests, said resilient assembly allowing sufficient movement apart of said lenses to permit the making of such adjustment while adapted to maintain said lenses in either of said adjusted positions as desired.

3. A mounting for spectacles having bifocal lenses, said mounting comprising a bridge having a top portion and a pair of side portions, means connecting said side portions to said lenses respectively, one of said means including a spring element, a second bridge having a top portion and a pair of side portions, means connecting said side portions of said second bridge to said lenses respectively, each of said latter mentioned means including toggle-joint connections having their axes at right angles to the plane of said lenses and adapted to permit the adjustment of said lenses to high or low position with respect to said second bridge, nose rests carried by said second bridge, said first and second bridges being similar in general shape and size and said bridges being so positioned relatively with respect to each other as to enable said second bridge to be substantially concealed behind said first bridge when said lenses are in low position with reference to said second bridge, said spring element adapted to allow sufficient lateral movement apart of said lenses to permit said adjustments of said lenses with respect to said second bridge to be made, and said first bridge and its connecting means acting to maintain said lenses and said second bridge in the desired adjusted relationship with each other.

JULIUS S. ZELL.